United States Patent [19]
Tatsuki et al.

[11] Patent Number: 5,349,578
[45] Date of Patent: Sep. 20, 1994

[54] TIME SLOT SWITCHING FUNCTION DIAGNOSTIC SYSTEM

[75] Inventors: Noboru Tatsuki; Hideaki Funae, both of Tokyo, Japan

[73] Assignee: NEC Corporation, Japan

[21] Appl. No.: 879,615

[22] Filed: May 7, 1992

[30] Foreign Application Priority Data

May 10, 1991 [JP] Japan .................................. 3-105834
Sep. 4, 1991 [JP] Japan .................................. 3-250284

[51] Int. Cl.[5] ............................ H04J 1/16; H04J 3/14
[52] U.S. Cl. ........................................ 370/13; 370/68; 371/20.4
[58] Field of Search .................. 370/13, 14, 15, 112, 370/68; 371/20.1, 20.4, 20.5, 20.6, 27, 67.1, 68.2; 340/825.16

[56] References Cited

U.S. PATENT DOCUMENTS

| | | | |
|---|---|---|---|
| 3,869,603 | 3/1975 | Auspurg et al. | 371/20.4 |
| 4,383,312 | 5/1983 | Reed | 371/27 |
| 4,491,838 | 1/1985 | West | 340/825.05 |
| 4,782,487 | 11/1988 | Smelser | 371/27 |
| 4,965,799 | 10/1990 | Green et al. | 371/21.2 |
| 5,072,447 | 12/1991 | Perloff et al. | 371/20.1 |
| 5,138,608 | 8/1992 | Kucera et al. | 371/20.4 |

Primary Examiner—Douglas W. Olms
Assistant Examiner—Chau T. Nguyen
Attorney, Agent, or Firm—Ostrolenk, Faber, Gerb & Soffen

[57] ABSTRACT

According to this invention, a time slot switching function diagnostic system includes a first inserting circuit, a data memory, an address controller, a second inserting circuit, and a check circuit. The first inserting circuit inserts path monitoring test pattern data into a specific on-line time slot of a unit frame consisting of N time slots. The data memory writes and reads data input to the time slots. The address control circuit supplies write and read addresses to the data memory. The second inserting circuit feeds back an output from the data memory to an input side to repetitively insert the test pattern data in time slots sequentially following the specific time slot. The check circuit extracts the test pattern data from an output corresponding to an Nth time slot of the data memory to check the test pattern data.

1 Claim, 7 Drawing Sheets

| TIME SLOT NUMBER | READ ADDRESS | WRITE ADDRESS |
|---|---|---|
| TS 1 | N | 1 |
| 2 | 1 | 2 |
| 3 | 2 | 3 |
| 4 | 3 | 4 |
| ⋮ | ⋮ | ⋮ |
| N-1 | N-2 | N-1 |
| N | N-1 | N |

|     | F1 | F2 | F3 | F4 | F5 | F6 | F7 | F8 | F9 |
|-----|----|----|----|----|----|----|----|----|----|
| 206 | A | B | C | T | A | B | C | T | A | B | C | T | A | B | C | T |
| 208 | 1 | 2 | 3 | 4 | 1 | 2 | 3 | 4 | 1 | 2 | 3 | 4 | 1 | 2 | 3 | 4 |
| 224 |   | 1 |   |   |   |   |   |   |   | 4 |   |   |   |   |   |   |
| 226 | 4 | 2 | 3 | 1 | 1 | 4 | 3 | 2 | 1 | 2 | 4 | 3 | 1 | 2 | 3 | 4 |
| 210 | 2 | 3 | 1 | 4 | 2 | 3 | 1 | 4 | 2 | 3 | 1 | 4 | 2 | 3 | 1 | 4 |
| 229 |   |   |   | 1 |   | 2 |   |   |   | 3 |   |   |   | 4 |   |   |
| 231 | 2 | 3 | 1 | 4 | 2 | 3 | 1 | 4 | 3 | 1 | 2 | 4 | 1 | 3 | 2 | 4 | 1 | 2 | 2 | 3 | 1 | 4 | 2 | 3 | 1 | 4 |
| 212 |   |   |   |   |   |   |   |   | B | C | A | T |
| 214 | B | C | A | T |   |   |   |   | B | C | A | T |   |   |   |   | B | C | A | T |
| 217 | B | C | A | T | B | C | A | T | B | C | A | X | B | C | A | T | B | C | A | X |
| 220 | T | T | T | T | T | T | T | X | T |
| 222 | OK | OK | OK | OK | OK | OK | OK | NG | OK |

FIG. 6 PRIOR ART

TIME SLOT SWITCHING FUNCTION DIAGNOSTIC SYSTEM

BACKGROUND OF THE INVENTION

The present invention relates to a time-division multiplexing apparatus in a digital transmission system and, more particularly, to a diagnostic system for a time slot switching circuit which is built in this apparatus and switches between various media on a time basis.

A conventional system for monitoring an operation of a time slot switching circuit of this type uses the following method. A specific time slot is exclusively assigned for monitoring a path to monitor operations of a data memory and an address control memory constituting the time slot switching circuit, and the operation is constantly checked by monitoring data. That is, the monitoring is performed only in an on-line state.

According to this conventional monitoring method, a constant monitoring operation is basically performed. Once the monitoring operation is started, the same monitoring operation is constantly performed. In addition, the monitoring method and monitoring items fixedly serve as only a part of a time slot switching function. For this reason, for example, the conventional monitoring method cannot effectively function to provide an easy operation checking means for performing an adjusting operation and a starting operation when the apparatus is loaded on site. The conventional monitoring method cannot effectively function to provide discrimination means for determining whether or not the time slot switching function is proper to examine a failure position when a failure has occurred in an operating state of the system. In addition, the conventional monitoring method cannot effectively function to provide checking of an operation on an off-line unit of a system having an arrangement consisting of two functional units each having the time slot switching circuit, i.e., provide a means for checking that the system is normally operated upon switching between the time slots.

SUMMARY OF THE INVENTION

It is an object of the present invention to provide a time slot switching function diagnostic system capable of also performing self-diagnosis of a time slot switching function in an off-line state.

It is another object of the present invention to provide a time slot switching function diagnostic system in which a checking operation at the time of apparatus installation, an operation for determining whether a time slot switching function is proper or not upon occurrence of a failure, and an operation for constantly checking an operation of a non-operated unit of an arrangement having two functional units can be facilitated.

It is still another object of the present invention to provide a time slot switching function diagnostic system capable of monitoring all time slots.

In order to achieve the above objects, according to the present invention, there is provided a time slot switching function diagnostic system comprising first inserting means for inserting path monitoring test pattern data into a specific on-line time slot of a unit frame consisting of N time slots, a data memory for writing and reading data input to the time slots, address control means for supplying write and read addresses to the data memory, second inserting means for feeding back an output from the data memory to an input side to repetitively insert the test pattern data in time slots sequentially following the specific time slot, and check means for extracting the test pattern data from an output corresponding to an Nth time slot of the data memory to check the test pattern data.

DESCRIPTION OF THE PREFERRED EMBODIMENTS

The present invention will be described below with reference to the accompanying drawings.

Figure 1:
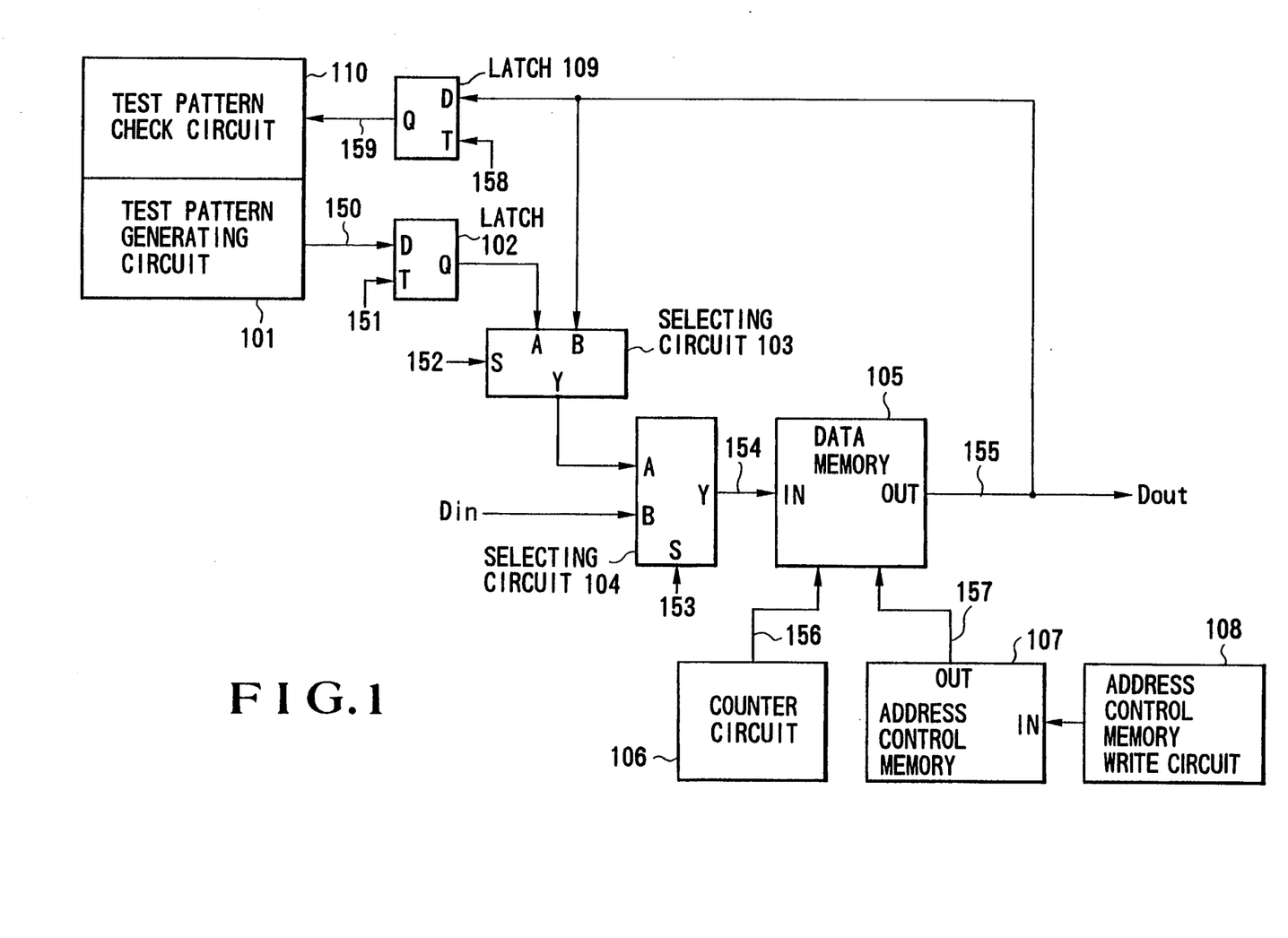
FIG. 1 is a block diagram showing an arrangement of a time slot switching function diagnostic system according to an embodiment of the present invention.

FIG. 1 shows an arrangement of an embodiment of the present invention. FIGS. 2A and 2B and FIGS. 3A to 3G explain an operation of the embodiment of the present invention.

Figure 3A:
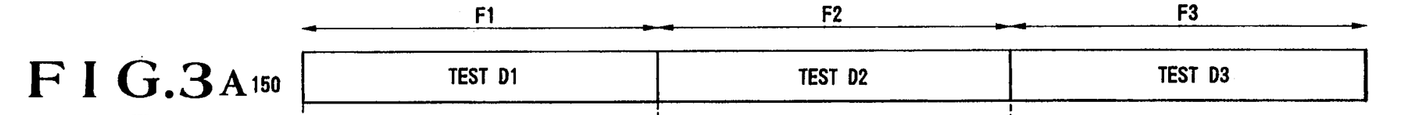
FIG. 3A to 3G are timing charts for explaining the operation of the system in FIG. 1.
Figure 3B:
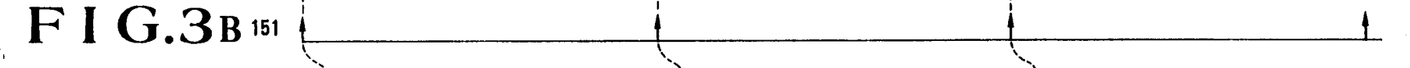
Figure 3C:
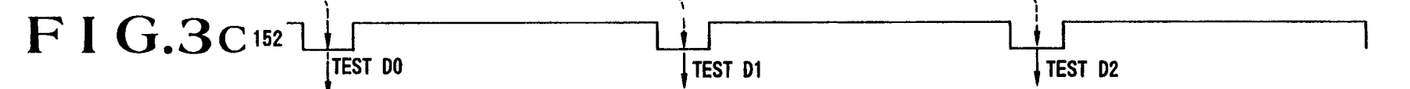

In the circuit of FIG. 1, when a self-diagnostic function is started, a selecting circuit 104 selects a signal from a selecting circuit 103 which is a characteristic circuit in the present invention. This signal is obtained such that a test pattern 150 generated by a test pattern generating circuit 101 is latched by a latch 102 in response to a timing signal 151. In the selecting circuit 103, this signal is inserted in a start time slot TS1 of each of unit frames F1 to F3, each consisting of N time slots, in response to a timing signal 152 (FIGS. 3A to 3C).

Figures 3D, 3E, 3F:
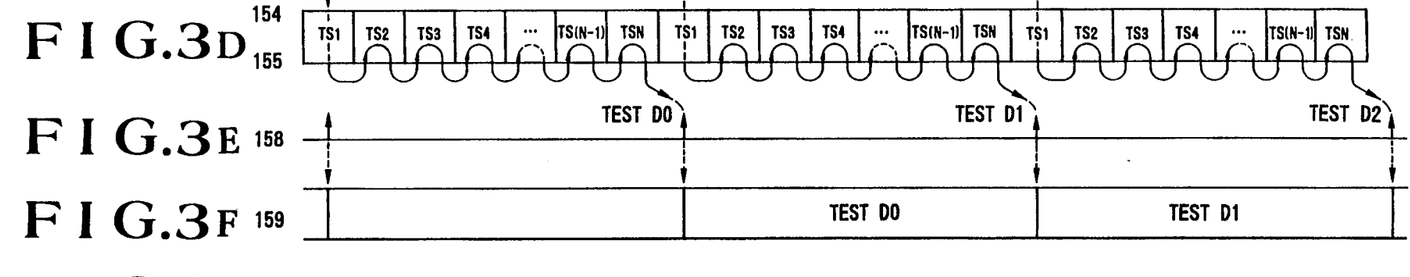

Data 154 inserted in the time slot TS1 is input to a data memory 105 of a sequential address writing method and a random address reading method so as to be written at an address "1" in accordance with sequential addresses 156 generated by a counter circuit 106 (FIG. 3D).

Figure 2A:
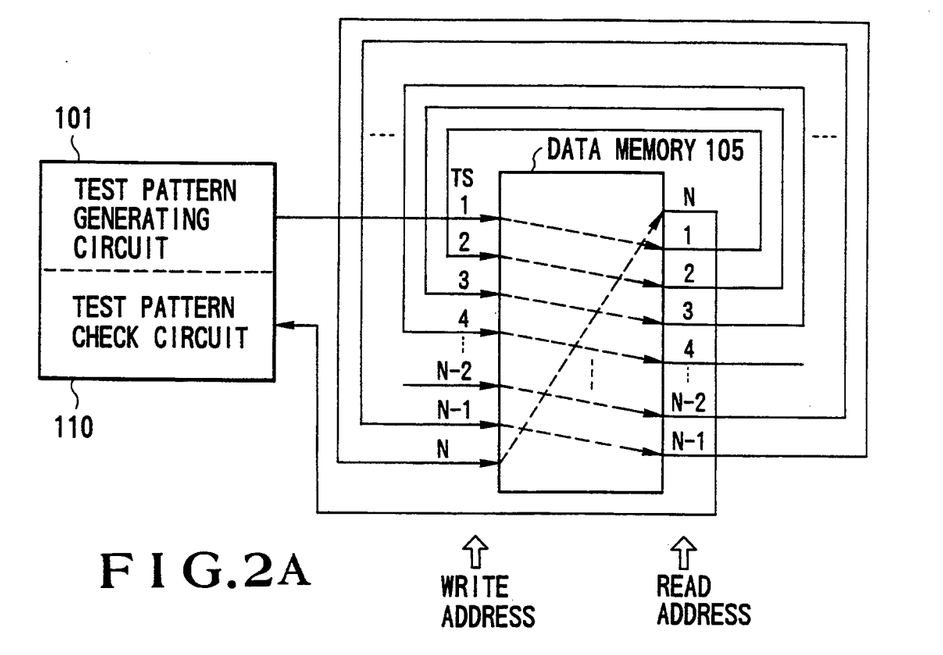
FIGS. 2A and 2B are views for supplementarily explaining an operation of the system in FIG. 1.
Figure 2B:
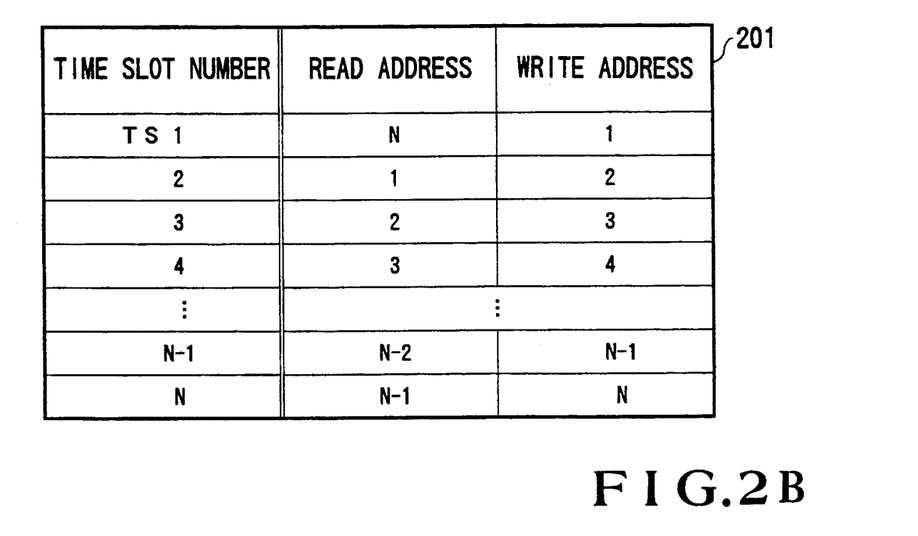

At this time, the sequential addresses are ascending addresses 1, 2, ..., N-1, and N, and they are generated by the counter circuit 106. A random address 157 is generated by an address control memory 107, and the content of the random address is written from an address control memory write circuit 108 in advance. When the self-diagnostic function is started, address values in a table 201 shown in FIG. 2B are written in the address control memory 107.

In a time slot TS2, a signal of the address "1" is read in response to the signal 157 on the basis of the table 201, and an output signal 155 is input as the input signal 154 to the data memory 105 through the selecting circuits 103 and 104 and immediately written at an address "2" in response to the signal 156. At this time, the selecting circuit 103 repetitively selects a test pattern (inserted in an output 155 from the data memory 105) from an input B of the selecting circuit 103 at all timings except for the timing of the time slot TS1. As shown in FIG. 2A, the write address of a given time slot is used as the read address of the next time slot, and a test pattern is circulated by shifting the time slot one by one.

In a next time slot TS3, as in the time slot TS2, the signal of the address "2" is read out and immediately written at an address "3". Subsequently, the same operation as described above is repeated up to a time slot TSN.

Figure 3G:
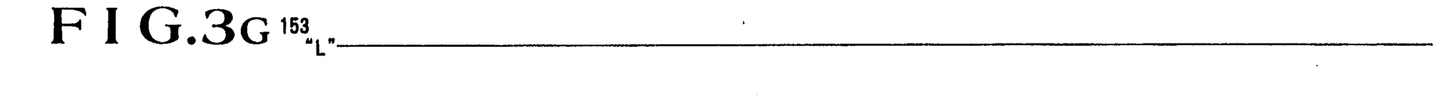

As shown in FIG. 3D, a signal written at an address "N" in the time slot TSN is the signal obtained such that the signal written in the time slot TS1 is relayed through the time slots TS2, TS3, TS4, ... TSN after all, and the signal is equal to the signal inserted in the time slot TS1. Finally, in the next time slot, i.e., a time slot TS1 of a frame F2, data written at the address "N", i.e., in the time slot TSN of the immediately preceding frame F1 is read out, and this signal is latched by a latch 109 at a timing of a signal 158 and input as a signal 159 to a test pattern check circuit 110 so as to be checked (FIGS. 3E and 3F). During the above diagnostic operation, the selecting circuit 104 selects only an output from the selecting circuit 103 in response to a signal 153 and does not select a main signal Din (FIG. 3G).

As described above, since the first time slot is inserted in all the time slots of the unit frames F1 to F3, all the time slots TS1 to TSN are constantly monitored. In the above description, although the time slot TS1 is used as a specific time slot, the time slot TS2 or a time slot following the time slot TS2 may be used. However, since the time slot TS1 is most effective, the time slot TS1 is preferably used as the specific time slot except when the time slot ST1 cannot be used due to some reason.

As described above, according to the present invention, in a time slot switching function diagnostic system of a time-division multiplexing apparatus in a digital transmission system, a circuit for feeding back an output signal from a data memory to an input side is provided, and an address control memory and a write circuit thereof operate to support the feedback function. Therefore, diagnosis and self-diagnosis of an operation of a time slot switching circuit obtained by integrating a data memory, an address control memory, and a write circuit thereof can be performed in an off-line state, and a checking operation at the time of apparatus installation, an operation for determining whether a time slot switching function is proper or not upon occurrence of a failure, and an operation for constantly checking an operation of a non-operated unit of an arrangement having two functional units can be facilitated.

Figure 4:
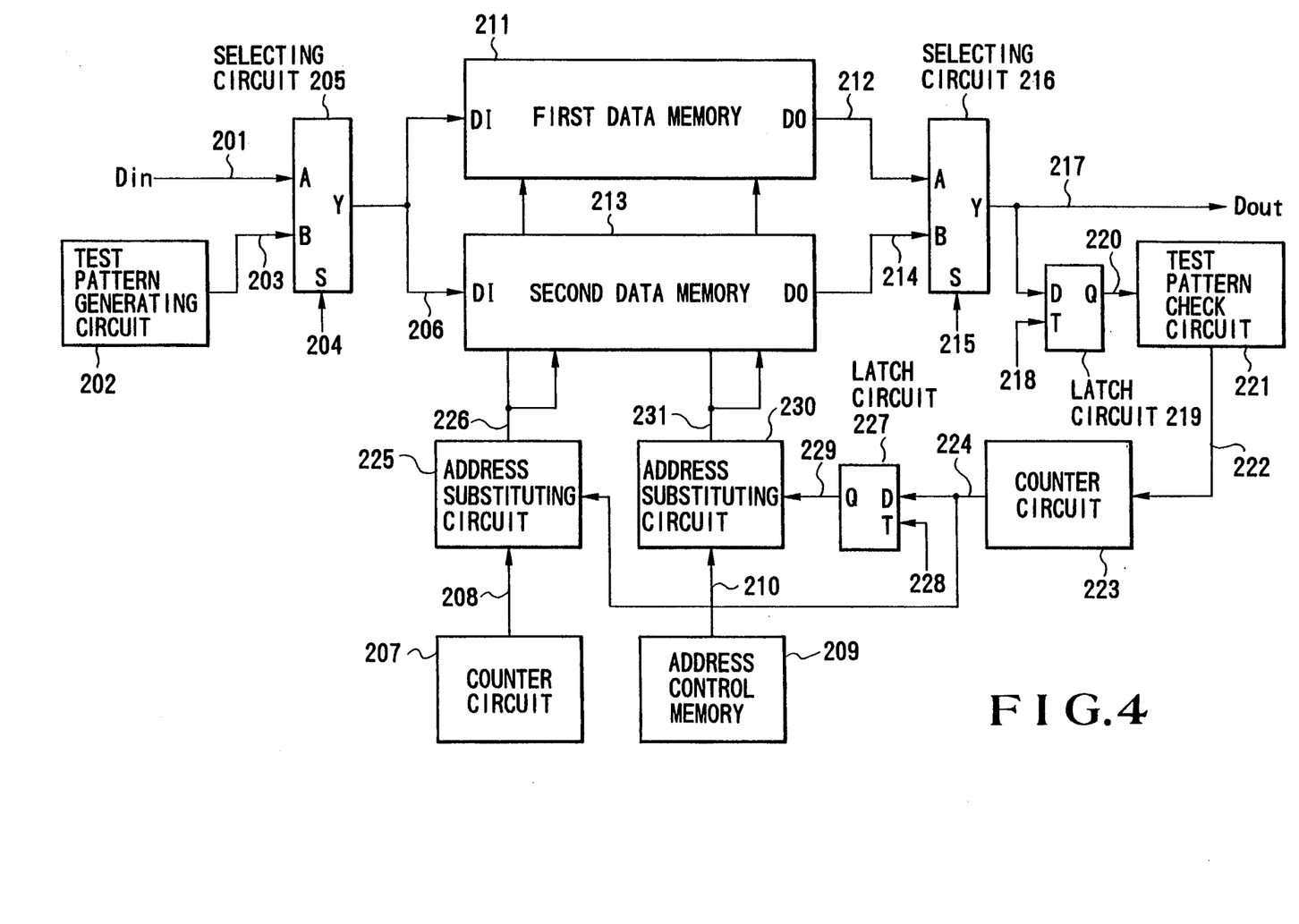
FIG. 4 is a block diagram showing a time slot switching function diagnostic system according to another embodiment of the present invention.

FIG. 4 shows a time slot switching function diagnostic system according to another embodiment of the present invention.

In FIG. 4, reference numeral 201 denotes an input main signal; 202, a test pattern generating circuit; 203, a test pattern generated by the test pattern generating circuit; 205, a selecting circuit for switching the insertion of the main signal 201 and the test pattern 203; 204, an input switching control signal input to the S input of the selecting circuit 205; 206, input data; 207, a counter circuit for a write address; 208, a write address designated from the counter circuit 207; 209, an address control memory for a read circuit; 210, a read address designated from the address control memory 209; 211, a first data memory; 212, output data from the first data memory 211; 213, a second data memory; 214, output data from the second data memory 213; 216, a selecting circuit on a memory data output side; 215, a switching control signal for a selecting circuit; 217, output data from a time slot switching circuit; 218, a pattern extraction latching clock; 219, a latch circuit for latch-extracting a pattern in response to the clock 218; 220, latch output data; 212, a test pattern check circuit; 223, a counter circuit for controlling test address generation; 222, a signal, for causing the pattern check circuit 212 to control the counter circuit 223; 224, a test address generated by the counter circuit 223; 225, an address substituting circuit for performing substitution between the write address 208 and the test address 224; 226, a substitution write address generated by the address substituting circuit 225; 227, a latch circuit for a read circuit; 228, a clock input to the latch circuit 227 to cause the latch circuit 227 to generate timing signals for the address signal to the counter circuit 223 and the read address from the counter circuit 223; 229, a latch test address output from the latch circuit 227; 230, an address substituting circuit for performing substitution between the read address 210 and the latch test address; and 231, a substitution read address generated by the address substituting circuit.

Figure 5:
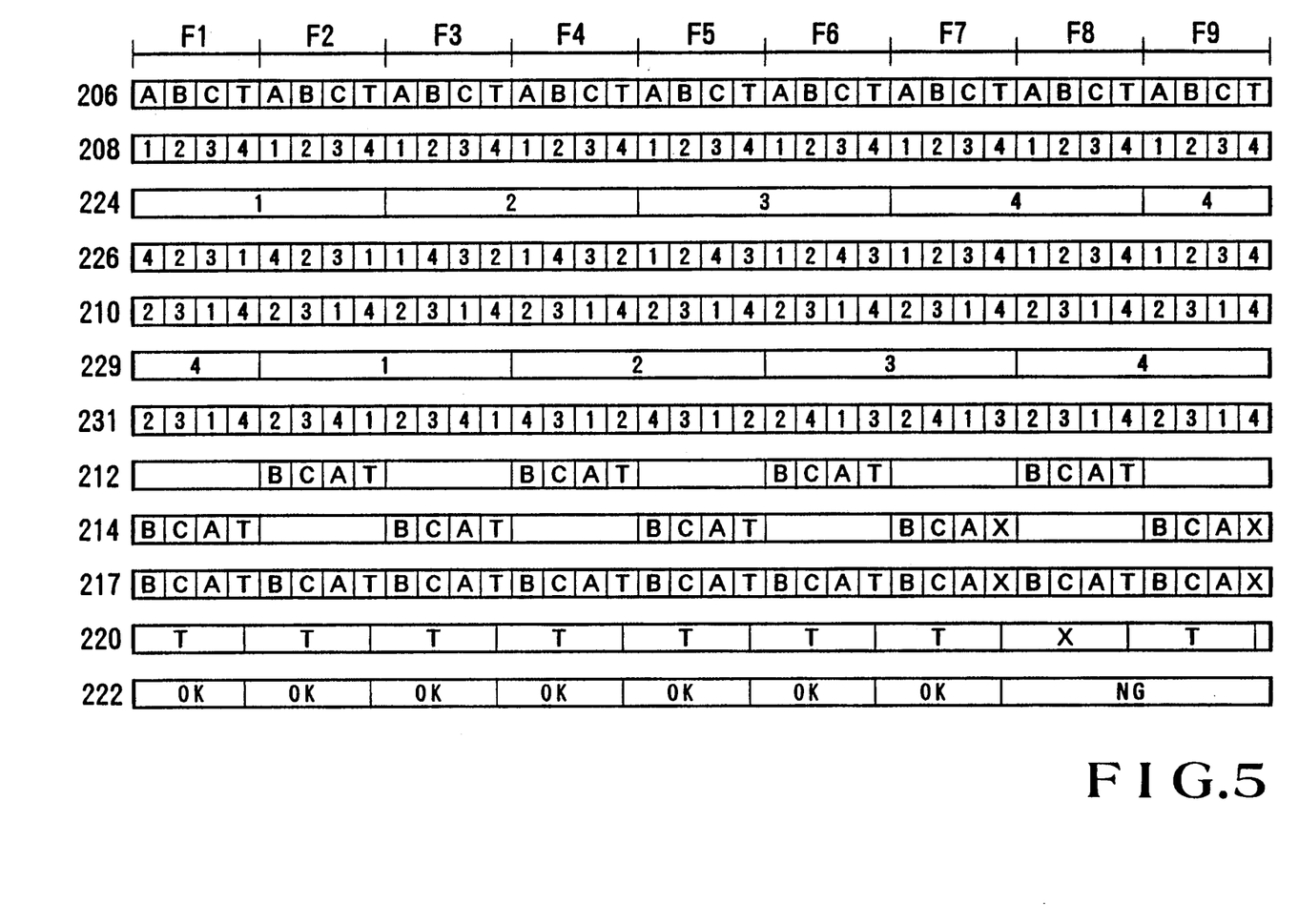
FIG. 5 is a timing chart for explaining an operation of the system in FIG. 4.
Figure 6:
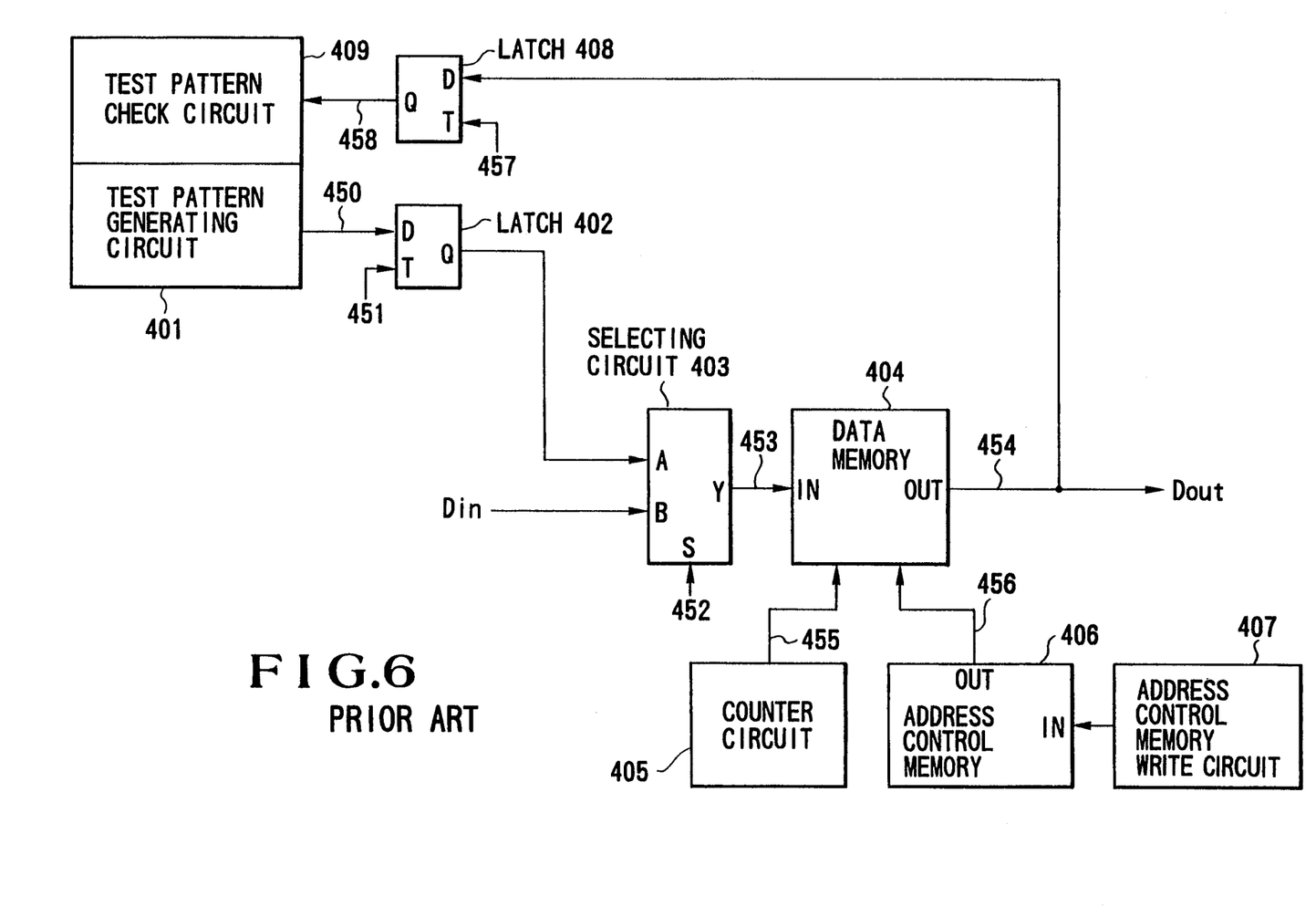
FIG. 6 is a view showing a system arrangement of a conventional constant monitoring method of a specific time slot in an on-line state.

FIG. 5 explains the operation of a time slot switching function diagnostic system according to another embodiment of the present invention.

The operation of this embodiment arranged as described above will be described below with reference to FIGS. 4 and 5.

The counter circuit 223 generates the test address 224 corresponding to the control signal 222 from the test pattern check circuit 221.

Now the write address 208 sent from the counter circuit 207 and the test address 224 are logically compared to detect coincidence between the write address 208 and the test address 224.

When coincidence is detected, the write address 208 is changed to the spare address 4. This is because, at this time, the time slot which corresponds to this write address 208 is used for testing, and a substitute time-slot is necessary.

This substitute time-slot is called the "spare time-slot" (time slot "4"), and the address which corresponds to this time-slot is called the "spare-address"(address "4").

This spare address is supplied to the first data memory 211 and the second data memory 213 by the address substituting circuit 225. When the write address 208 coincides with the spare address (address 4), this time period is just the test-time period and is exclusively used for testing the time-slot of the test address 224. Therefore, at this time, the address substituting circuit 225 supplies the test address 224 to the first data memory 211 and the second data memory 213, such that a write operation is performed by the substitution write address 226 as a write address.

In cases other than the above case, the write address 208 is directly supplied to the first data memory 211 and the second data memory 213 as, e.g., an address for a test pattern.

That is, assuming that the spare time-slot number and the spare address is set to be "4," in a unit frame F1 which consists of 4 time-slots and, in which a write address "1234" is designated, when the write address 208 coincides with the test address 224 "1," the write address 208 is substituted with the spare address 4. Meanwhile, when the write address 208 coincides with address "4," this time is defined for testing and the write address 208 is substituted with the test address "1," and when the write address 208 are "2" and "3," these addresses are directly supplied to the first and second data memories 211 and 213, respectively.

In the read circuit, when the read address 210 sent from the address control memory 209 coincides with the latch test address 229, the address substituting circuit 230 supplies a spare address 4 to the first data memory 211 and the second data memory 213. This is because the time-slot whose number coincides with the test address 229 is substituted with the spare time-slot in the write circuit.

Meanwhile, when the read address 210 coincides with the address 4, this time slot is defined for testing, and the address substituting circuit 230 supplies the latch test address 229 to the first data memory 211 and the second data memory 213 as a read address.

In cases other than the above case, the read address 210 for a test pattern is supplied to the first and second data memories 211 and 213.

When the state during the above operation is observed with reference to FIG. 5, the substitution write address 226 for performing address substitution is generated using the write address 208 and the test address 224 by the above method.

On the other hand, the substitution read address 231 is generated using the address 210 and the latch test address 229 by the same method as in the write operation.

Write and read operations for the first and second data memories 211 and 213 will be described below using the unit frame F1. The data and addresses are set as follows:

input data 206: "ABCT"
write address 208: "1234"
substitution write address 226: "4231"
read address 210: "2341"
latch test address 229: "4"
substitution read address 231: "2314"
memory output data 212: "BCAT"
memory output data 214: "BCAT"

Therefore, since the substitution write address 226 is set to be "4231", the unit frame of the input data 206 is changed from "ABCT" to "TBCA".

On the other hand, since the substitution read address 231 is set to be "2314", "2314" corresponding to "TBCA" becomes "BCAT". Similarly, in a frame F3, "1432" of the substitution write address 226 becomes "ATCB", and the substitution read address 231 corresponding to "ATCB" is "4312" which becomes "BCAT".

With the above substitution address operation, a test pattern passes through a time slot designated by a test address, and the main signal 201 which is supposed to pass through the pervious time slot passes through a time slot designated by a spare address designated by a substitution address.

In the test address 224, since all the address values are sequentially obtained by the control of the test pattern check circuit 221, the test pattern passes through all the time slots.

Pattern data output as described above is checked in the test pattern check circuit 221. When each of the latch output data 220 and the counter control signal 222 has NG represented by X as shown in FIG. 5, the test pattern check circuit 221 causes the counter control signal 222 to interrupt the counter circuit 223. Therefore, the main signal 201 is kept to pass through the preliminary time slot, and the test pattern is kept to pass through a time slot to be tested, thereby taking a countermeasure against an accident.

Figure 7A:
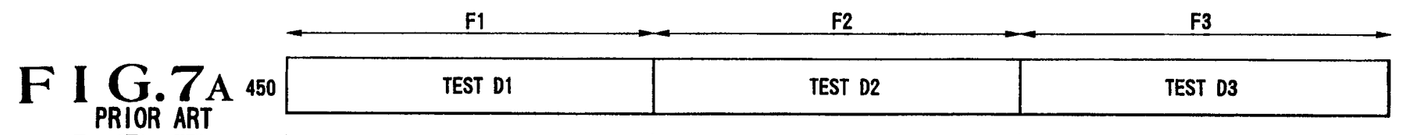
FIGS. 7A to 7F are timing charts for explaining an operation of a conventional system.
Figure 7B:
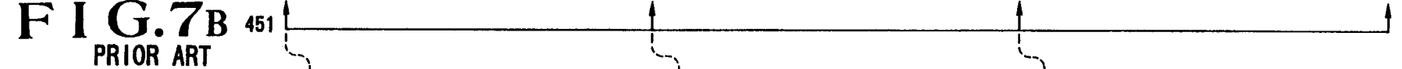
Figure 7C:
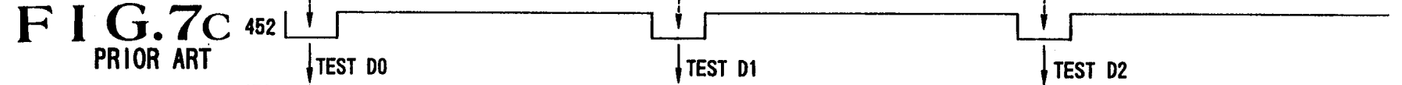
Figure 7D:
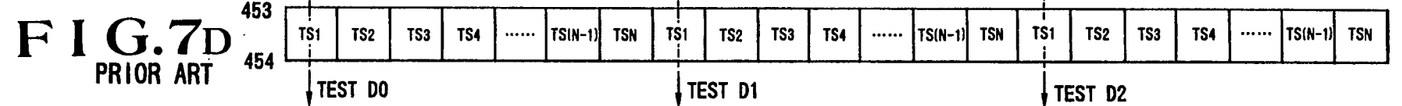
Figure 7E:
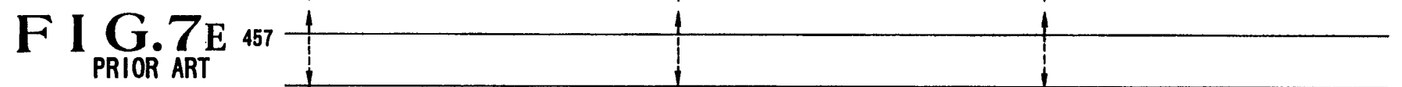
Figure 7F:
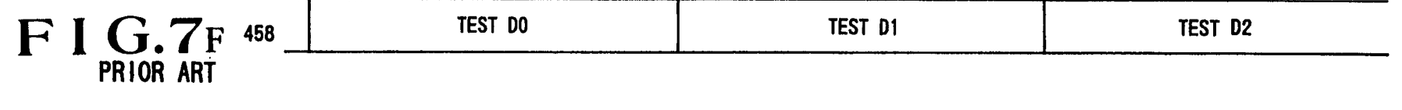

FIGS. 6 and 7A to 7F show the operation and an arrangement of a conventional system. A selecting circuit 403 selects a main signal Din sent from an input and path monitoring data TESTD1 to TESTD3 sent at a timing of a signal 451 generated by a test pattern generating circuit 401. The selecting circuit 403 is controlled by a signal 452 and selects a test pattern in a path monitoring time slot of each of unit frames F1 to F3 (FIGS. 7A to 7C). The selecting circuit 403 selects the main signal in each of other slots. A path monitoring pattern 453 selected by the selecting circuit 403 is written in a time slot TS1 and stored in a data memory 404. A counter circuit 405, an address control memory 406, and an address control memory write circuit 407 supply addresses 455 and 456 to the storage content of the data memory 404, such that the storage content is output as an output signal 454 (Dout). A monitoring pattern inserted in the output signal 454 is tested by a pattern check circuit 409 in response to a signal 457 (FIGS. 7E and 7F). That is, as shown in FIG. 7D, in the time slot TS1, both of write and read addresses are designated by "1", and only that time slot is an object to be fixedly and constantly monitored. Note that reference numerals 402 and 408 denote latch circuits.

As described above, according to the present invention, a time slot switching function diagnostic system comprises a test address generating circuit for generating a test address and an address substituting circuit for substituting write and read addresses with a test address. Therefore, the time slot switching function diagnostic system can monitor time slots corresponding to all the addresses. In addition, in the time slot switching function diagnostic system, when a discrimination result obtained by a test pattern check circuit is NG, the test address generating circuit is interrupted such that a main signal which is supposed to pass through a defective time slot is bypassed to a preliminary time slot, thereby advantageously continuing communication.

What is claimed is:

1. A time slot switching function diagnostic system comprising:

test pattern generating means for generating a test pattern;

test pattern inserting means for inputting the test pattern from said test pattern generating means and an input signal having a unit frame consisting of N time slots and for inserting the test pattern into a specific time slot of the input signal in response to a pattern switching control signal;

a data memory for storing an output from said test pattern inserting means and outputting data in accordance with write and read addresses;

test pattern check means for checking a pattern extracted from the output data of said data memory in response to a clock signal;

test address generating means, controlled by a control signal from said test pattern check means, for generating a test address; and address substituting means for substituting the write and read addresses of said data memory address generating means in order to switch the test pattern to another time slot;

a first counter circuit for generating a sequential write address in an order of the N time slots, an address control memory for generating a read address of a predetermined pattern in an order of the N time slots, a latch circuit for adjusting a timing difference between the write address from said first counter circuit and the test address from a second counter circuit serving as said test address generating circuit by one time slot, a substitution write address generating circuit for generating a substitution write address of said data memory by using the write address from said first counter circuit and the test address from said second counter circuit, and a substitution read address generating circuit for generating a substitution read address of said data memory by using the read address from said address control memory and the test address adjusted by said latch circuit.

* * * * *